(12) United States Patent
Mattsson et al.

(10) Patent No.: US 7,594,266 B2
(45) Date of Patent: Sep. 22, 2009

(54) DATA SECURITY AND INTRUSION DETECTION

(75) Inventors: Ulf Mattsson, Cos Cob, CT (US); Mike Hsu, San Jose, CA (US)

(73) Assignee: Protegrity Corporation, Stamford, CT (US)

(*) Notice: Subject to any disclaimer, the term of this patent is extended or adjusted under 35 U.S.C. 154(b) by 0 days.

(21) Appl. No.: 11/540,467

(22) Filed: Sep. 29, 2006

(65) Prior Publication Data

US 2007/0083928 A1 Apr. 12, 2007

Related U.S. Application Data

(63) Continuation-in-part of application No. 11/510,185, filed on Aug. 25, 2006, now Pat. No. 7,305,707.

(30) Foreign Application Priority Data

Nov. 23, 2001 (EP) .................................. 01127906

(51) Int. Cl.
*G06F 11/00* (2006.01)
*G06F 11/22* (2006.01)
*G06F 12/14* (2006.01)
*G06F 1/00* (2006.01)

(52) U.S. Cl. ............................. 726/22; 726/23; 726/24

(58) Field of Classification Search ................... 726/22, 726/23, 24
See application file for complete search history.

(56) References Cited

U.S. PATENT DOCUMENTS

| 4,866,707 A | 9/1989 | Marshall et al. |
| 4,956,769 A | 9/1990 | Smith |
| 5,265,221 A | 11/1993 | Miller et al. |
| 5,271,007 A | 12/1993 | Kurahashi et al. |
| 5,278,901 A | 1/1994 | Shieh et al. |
| 5,283,830 A | 2/1994 | Hinsley et al. |

(Continued)

FOREIGN PATENT DOCUMENTS

EP 0 999 490 5/2000

(Continued)

OTHER PUBLICATIONS

Christopher Kruegel, Giovanni Vigna, "Anomaly Detection of Web-Based Attacks", Oct. 2003, CCS '03: Proceedings of the 10th ACM conference on Computer and communications security, pp. 251-261.*

(Continued)

*Primary Examiner*—Emmanuel L Moise
*Assistant Examiner*—Courtney D Fields
(74) *Attorney, Agent, or Firm*—Edwards Angell Palmer & Dodge LLP; George W. Neuner; Brian R. Landry

(57) ABSTRACT

Systems and methods are provided for the detection and prevention of intrusions in data at rest systems such as file systems and web servers. Item requests are examined to determine if the request and/or the result violates an item access rule. If either the request or the result violates the item access rule, an access control manager is alerted and appropriate action is taken such as not complying with the item request. Embodiments of the invention also produce a scorecard to represent the severity of an intrusion threat.

35 Claims, 2 Drawing Sheets

U.S. PATENT DOCUMENTS

| | | | |
|---|---|---|---|
| 5,333,197 A | 7/1994 | Febvre | |
| 5,343,527 A | 8/1994 | Moore | |
| 5,369,702 A | 11/1994 | Shanton | |
| 5,375,169 A | 12/1994 | Seheidt et al. | |
| 5,438,508 A | 8/1995 | Wyman et al. | |
| 5,446,903 A | 8/1995 | Abraham et al. | |
| 5,493,668 A | 2/1996 | Elko et al. | |
| 5,504,814 A | 4/1996 | Miyahara | |
| 5,572,652 A | 11/1996 | Robusto et al. | |
| 5,606,610 A | 2/1997 | Johansson | |
| 5,748,884 A | 5/1998 | Royce et al. | |
| 5,751,949 A | 5/1998 | Thomson et al. | |
| 6,321,201 B1 | 11/2001 | Dahl | |
| 6,327,595 B1 | 12/2001 | Lyson et al. | |
| 6,389,414 B1 | 5/2002 | Delo et al. | |
| 6,405,318 B1* | 6/2002 | Rowland | 726/22 |
| 6,513,060 B1 | 1/2003 | Nixon et al. | |
| 6,647,400 B1 | 11/2003 | Moran | |
| 6,678,822 B1 | 1/2004 | Morar et al. | |
| 6,751,949 B2 | 6/2004 | Tamura et al. | |
| 6,754,664 B1 | 6/2004 | Bush | |
| 6,766,368 B1 | 7/2004 | Jakobson et al. | |
| 6,950,518 B2 | 9/2005 | Henson et al. | |
| 6,963,980 B1 | 11/2005 | Mattsson | |
| 7,111,005 B1 | 9/2006 | Wessman | |
| 7,120,933 B2 | 10/2006 | Mattsson | |
| 7,305,707 B2 | 12/2007 | Mattsson | |
| 7,325,129 B1 | 1/2008 | Mattsson et al. | |
| 7,418,098 B1 | 8/2008 | Mattsson et al. | |
| 2001/0052014 A1 | 12/2001 | Sheymov et al. | |
| 2002/0007461 A1 | 1/2002 | Garrisson et al. | |
| 2002/0023227 A1* | 2/2002 | Sheymov et al. | 713/201 |
| 2002/0066038 A1 | 5/2002 | Mattsson et al. | |
| 2002/0174352 A1 | 11/2002 | Dahl et al. | |
| 2003/0101355 A1 | 5/2003 | Mattsson | |
| 2004/0139448 A1 | 7/2004 | Hope et al. | |
| 2004/0267893 A1 | 12/2004 | Lin | |
| 2005/0015626 A1 | 1/2005 | Chasin | |
| 2006/0070118 A1* | 3/2006 | Munson et al. | 726/3 |
| 2006/0179296 A1 | 8/2006 | Bartlett et al. | |
| 2007/0174271 A1 | 7/2007 | Mattsson et al. | |

FOREIGN PATENT DOCUMENTS

| | | |
|---|---|---|
| EP | 1207443 A2 | 5/2002 |
| EP | 1207462 A2 | 5/2002 |
| EP | 1209550 A2 | 5/2002 |
| EP | 1 211 589 A2 | 6/2002 |
| EP | 1 315 065 | 5/2003 |
| GB | 2 242 295 | 9/1991 |
| GB | 2248951 A | 4/1992 |
| JP | 2005-189996 | 7/2005 |
| RU | 2022343 C1 | 10/1994 |
| WO | WO 95/15628 | 6/1995 |
| WO | WO 95/22792 | 8/1995 |
| WO | WO 97/49211 | 12/1997 |
| WO | WO-01/35226 | 5/2001 |
| WO | WO-03/044638 | 5/2003 |
| WO | WO 2007058952 A2 * | 5/2007 |

OTHER PUBLICATIONS

Applied Cryptography Second Edition: protocols, algorithms, and source code in C; Bruce Schneier, John Wiley & Sons 1996, pp. 10-17, 193-197, 208-210 and 270-278.

An Introduction to Database Systems 7th Ed.; C.J. Date, Addison Wesley Longman, Inc. 2000 pp. 43-47, 69-78, 249-253 and 520-524.

23 DBMS Obfuscation_Toolkit; Oracle8i Supplied PL/SQL Packages Reference Release 2.

Database Security in Oracle8i, An Oracle Technical White Paper, Nov. 1999, pp. 1-30.

U.S. Appl. No. 11/357,741, filed Feb. 17, 2006, Mattsson.

Patricia Dwyer et al., "Query Processing in LDV: A Secure Database System", 4th Aerospace Computer Security Applications Conf. 118-124 (1988).

Cristi Garvey & Amy Wu, "ASD_Views", Proc. 1988 IEEE Symposium on Research in Security & Privacy 85-95 (1988).

Richard D. Graubart & Kevin J. Duffy, "Design Overview for Retrofitting Integrity-Lock Architecture onto a Commercial DBMS", Proc1985 Symposium on Security & Privacy 147-159 (1985).

Patricia A. Rougeau & Edward D. Sturms, "The Sybase Secure Dataserver: A Solution to the Multilevel Secure DBMS Problem", Proc 10th Nat'l Comp. Sec. Conf. 211-215 (1987).

Billy G. Claybrook, "Using Views in a Multilevel Secure Database Management System", Proc. 1983 Symp. on Sec. and Privacy 4-17 (1983).

Dorothy E. Denning et al., "Views for Multilevel Database Security", IEEE Transactions on Software Eng. 129-140 (1987).

Dorothy E. Denning, "Commutative Filters for Reducing Inference Threats in Multilevel Database Systems", Proc. 1985 Symp. on Sec. & Privacy 134-146 (1985).

Elisa Bertino, "Data Hiding & Security in Object-Oriented Databases", 8th Int'l Conf. on Data Engineering 338-347 (1992).

Masaaki Mizuno & Mitchell L Neilsen, "A Secure Quorum Protocol", 14th Nat'l Comp. Sec. Conf. 514-523 (1991).

E. John Sebes & Richard J. Feiertag, "Trusted Distributed Computing: Using Untrusted Network Software", 14th Nat'l Comp. Sec. Conf. 608-618 (1991).

Vijay Varadharajan, "A Security Reference Model for a Distributed Object System & its Application", 15th Nat'l Comp. Sec. Conf. 593-619 (1992).

George I. Davida, "Cryptographic Relational Algebra", Proc. 1982 Symp. on Sec. & Privacy 111-116 (1982).

D.E. Denning, "Cryptographic Checksums for Multilevel Database Security", Proc. 1984 Symp. on Sec. & Privacy, IEEE Computer Society Press, 52-61 (1984).

Selim G. Akl & Peter D. Taylor, "Cryptographic Solution to a Problem of Access Control in a Hierarchy", 1(3) ACM Trans. on Comp. Sys. 239-248 (Aug. 1983).

George I. Davida, David L. Wells, & John B. Kam, "A Database Encryption System with Subkeys", 6(2) ACM Trans. On Database Sys. 312-328 (Jun. 1981).

Jeffrey N. Thompson, Unit Fileutil.TPU V.1.0 (Dec. 1990), available at HTTP://www.bsdg.org/SWAG/FILES/0062.PAS.

Darrell Woelk and Won Kim, "Multimedia Information Management in an Object-Oriented Database System", Proc. 13th VLDB Conference 319-328 (1987).

IBM, "DB2 for OS/390 V5 Administration Guide" δ B.2, B.3.2, B.3.3, B.3.4, B.7, & B.7.4 (Apr. 20, 2000).

P.C. Yeh & R.M. Smith, Sr., "ESA/390 Integrated Cryptographic Facility: An Overview", 30(2) IBM Systems J. 192-205 (1991).

IBM, "IBM Database 2 Version 2: Application Programming & SQL Guide", 30, 31, 33, 48, 82, 102, 106, 286, & 529 (3d. ed. Mar. 1992).

Stephen L. Montgomery, "Relational Database Design & Implementation Using DB2" 10-11 (1990).

Bruce L. Larson, "The Database Experts' Guide to DATABASE 2" 23 and 372 (1988).

Charles F. Pfleeger, "Security in Computing" xii-xiii, 242-50, 336-76, 537-43 (2d. ed. 1997).

Deborah Downs & Gerald J. Popek, "A Kernal Design for a Secure Data Base Management System", Proc. Very Large Data Bases 507-514 (Oct. 1977).

D.G. Abraham et al., "Transaction Security System", 30(2) IBM Systems J. 206-229 (1991).

D.B. Johnson et al., "Common Cryptographic Architecture Cryptographic Application Programming Interface", 30(2) IBM Systems J. 130-150 (1991).

Matthew Morgenstern, "Controlling Logical Inference in Multilevel Database Systems", Proc. 1988 IEEE Symp. On Sec. & Privacy 245-255 (Apr. 1988).

Dorothy E. Denning, "Field Encryption & Authentication", Advances in Cryptology: Proc. Crypto 83 231-247 (1984).

Shirley Eichenwald, "Information Technologies: Physician-Hospital Networks", 63(3) J. AHIMA 50-51 (Mar. 1992).

C.C. Chang, "An Information Protection Scheme Based Upon No. Theory", 30(3) Computer J. 249-253 (1987).

Application Security, Inc., "DbEncrypt™ For Oracle User Guide" (2001).

George I. Davida et al., "A Database Encryption System with Subkeys", 6(2) ACM Trans. on Database Sys. 312-328 (Jun. 1981).

David K. Gifford, "Cryptographic Sealing for Information Secrecy & Authentication", 25(4) Comm. Of ACM 274-286 (Apr. 1982).

E. John Sebes & Richard J. Feiertag, Trusted Distributed Computing: Using Untrusted Network Software, Proc. 14th National Computer Security Conf. 608-618 (1991).

Lein Harn & Hung-Yu Lin, "A Cryptographic Key Generation Scheme for Multilevel Data Securtiy", 9(6) Computers & Security 539-546 (1990).

Wei Chen, "Techniques of Key Distribution & Management in Database Encryption", Proc. 3d Ann. Symp. Comp. Inf. Sec. 97-101 (Nov. 1992).

E. Gudes et al., "The Application of Cryptography for Data Base Security," AFIPS Press 97-107 (1976).

William T. Maimone & Ira B. Greenberg, "Single-Level Multilevel Secure Database Systems", Proc. $6^{th}$ Ann. Computer Security Applications Conf. 137-147 (1990).

E.B. Fernandez et al., "Database Security & Integrity" xi-xiv, 55-106, 183-216, 309-320 (1981).

David K. Hsiao et al., "Database Access Control in the Presence of Context Dependent Protection Requirements", SE-5(4) IEEE Trans. Software Eng. 349-358 (Jul. 1979).

Gary W. Smith, "Multilevel Secure Database Design: a Practical Application Proc.", 5th Ann. Computer Security Conf. 314-21 (1989).

Li Gong, "A Secure Identity-Based Capability System", Proc. 1989 IEEE Symp. Sec. & Privacy 56-63 (May 1989).

Sushil Jajodia & Boris Kagan, "Integrating an Object-Oriented Data Model with Multilevel Security", Proc. 1990 IEEE Computer Society Symp. Research in Security and Privacy 76-85 (1990).

Rafiul Ahad et al., "Supporting Access Control in an Object-Oriented Database Language", Advances in Database Technology - EDBT '92: Proc. 3d Int'l Conf. Extending Database Technology 184-200 (1992).

Gerald C. Chick & Stafford E. Tavares, "Flexible Access Control with Master Keys", 435 Lecture Notes in Comp. Sci. 316-22 (1990).

Ravinderpal S. Sandhu, "Cryptographic Implementation of a Tree Hierarchy for Access Control", 27 Information Processing Letters 95-98 (1988).

Udo Kelter, "Discretionay Access Controls", Proc. 1991 IEEE Symp. on Research in Security & Privacy 288-99 (1991).

R.W. Conway et al., "On the Implementation of Security Measures in Information Systems", 15(4) Communications of the ACM 211-220 (Apr. 1972).

Charles P. Pfleeger, "Security in Computing" Second Edition 544-74 (1997).

Frank L Mayer & J. Noelle McAuliffe, "The Design of the Trusted Workstation: A True 'INFOSEC' Product", in 2 Proc. 13th National Computer Security Conference 827-39 (1990).

Catherine Meadows, "Extending the Brewer-Nash Model to a Multilevel Context", Proc. 1990 IEEE Computer Society Symposium on Research in Security and Privacy 95-102 (1990).

Office Action for U.S. Appl. No. 11/510,185 (Apr. 3, 2007).

Ehud Gudes, "The Application of Cryptography to Data Base Security" (1976) (Doctoral Dissertation, The Ohio State University).

Darren Mutz, "Anomalous System Call Detection", 9(1) ACM Trans. on Information & Systems Sec. 61-93 (Feb. 2006).

Suresh N. Chari & Pau-Chen Cheng, "BlueBoX: A Policy-Driven, Host-Based Intrusion Detection System", 6(2) ACM Trans. on Information & Systems Sec. 173-200 (May 2003).

Trent Jaeger et al., "Managing Access Control Policies Using Access Control Spaces", in Proc. $7^{th}$ ACM Symp. Access Control Models & Technologies 3-12 (2002).

Milenko Drinić & Darko Kirovski, "A Hardware-Software Platform for Intrusion Prevention", in Proc. $37^{th}$ Int'l Symp. on Microarchitecture (MICRO-37'04) (2004).

Xiaolan Zhang et al., "Secure Coprocessor-based Intrusion Detection", in Proc. $10^{th}$ workshop on ACM SIGOPS European workshop 239-42 (2002).

\* cited by examiner

US 7,594,266 B2

DATA SECURITY AND INTRUSION DETECTION

CROSS-REFERENCE TO RELATED APPLICATIONS

This application is a continuation-in-part of U.S. patent application Ser. No. 11/510,185, filed Aug. 25, 2006 now U.S. Pat. No. 7,305,707, which in turn claims priority under 35 U.S.C. § 119 to European application number EPC 01127906.4, filed Nov. 23, 2001. The entire contents of each of these references are incorporated by reference herein.

TECHNICAL FIELD

The present invention generally relates to systems and methods of detecting and preventing intrusion in a database, file system or other data at rest system.

BACKGROUND INFORMATION

In database security, it is a known problem to avoid attacks from persons who have access to a valid user-ID and password. Such persons cannot be denied access by the normal access control system, as they are in fact entitled to access to a certain extent. Such persons can be tempted to access improper amounts of data, by-passing the security. Several solutions to such problems have been suggested and are discussed below.

I. Network-Based Detection

Network intrusion monitors are attached to a packet-filtering router or packet sniffer to detect suspicious behavior on a network during the suspicious behaviour. The router or sniffer looks for signs that: a network is being investigated for attack with a port scanner; users are falling victim to known traps like url or .lnk; or the network is actually under an attack such as through SYN flooding or unauthorized attempts to gain root access (among other types of attacks). Based on user specifications, these monitors can then record the session and alert the administrator or, in some cases, reset the connection. Some examples of such tools include NetRanger and Cisco Secure Intrusion Detection System available from Cisco Corporation of San Jose, Calif. and RealSecure® available from Internet Security Systems, Inc. (ISS) of Atlanta, Ga. as well as some public domain products like Klaxon, available at ftp://ftp.eng.auburn.edu/pub/doug/, that focus on a narrower set of attacks.

II. Server-Based Detection

Server-based detection tools analyze log, configuration and data files from individual servers as attacks occur, typically by placing some type of agent on the server and having the agent report to a central console. An example of these tools public domain tools that perform a much narrower set of functions is Tripwire®, available at http://sourceforge.net/projects/tripwire/, which checks data integrity. Tripwire® will detect any modifications made to operating systems or user files and send alerts to ISS's RealSecure® product. The Real-Secure® product will then conduct another set of security checks to monitor and combat any intrusions.

III. Security Query and Reporting Tools

Security query and reporting tools query network operating system (NOS) logs and other related logs for security events and/or glean logs for security trend data. Accordingly, these tools do not operate in real-time and rely on users providing the right questions of the right systems. For a typical example, a query might be how many failed authentication attempts have occurred on these NT servers in the past two weeks.

IV. Inference Detection

A variation of conventional intrusion detection is detection of specific patterns of information access known as inference detection. Inference detection is deemed to signify that an intrusion is taking place, even though the user is authorized to access the information. A method for such inference detection, i.e., a pattern oriented intrusion detection, is disclosed in U.S. Pat. No. 5,278,901 to Shieh et al., which is incorporated herein by reference.

None of these solutions are however entirely satisfactory. A primary drawback is that each solution concentrates on already effected queries, providing at best an information that an attack has occurred.

SUMMARY OF THE INVENTION

The invention relates, but is not necessarily limited, to detecting and preventing intrusions in data at rest systems, such as databases and file systems. Embodiments of the invention can be used for real-time prevention of intrusions without degrading the performance of other processes. Embodiments of the invention are also capable of machine-learning from previous intrusions in order to better predict future intrusions.

There is provided a method of detecting and preventing intrusion in a data at rest system comprising: receiving a plurality of intrusion detection profiles from an access control system, each profile including at least one item access rule, wherein a plurality of users are associated with at least one of the intrusion detection profiles; receiving a request for data in a data at rest system from a user; determining whether a result of said request causes the user to violate the at least one item access rule defined in the intrusion detection profile associated with the user; and if the at least one item access rule is violated, notifying the access control system to alter user authorization, thereby preventing the result of the request from being transmitted to the user.

In another embodiment, the method further comprises: accumulating results from performed requests; and determining whether the accumulated results violate any one of said at least one item access rule.

In a further embodiment, the at least one item access rules are selected from the group of a rule that limits access to the data at rest system at certain defined dates and/or times, a rule that prohibits access to the data at rest system, a rule that limits the user's ability to run a query at certain defined dates and/or times and a rule that prohibits the user from running a query.

In another embodiment, items subject to item access rules are marked in the data at rest system, and any request concerning said items automatically triggers intrusion detection.

In an alternative embodiment, the step of determining whether the result violates the item access rule is determining if an item access rate is exceeded, and proceeding with the intrusion detection process only upon determining that the item access rate is exceeded.

In another embodiment, the data at rest system is a file system. In a further embodiment, one of said at least one item access rules is selected from the group of rules consisting of a rule that defines the number of files a user may access from the file system at one time, a rule that defines the number of files a group of users may access from the file system at one time, a rule that defines the number of files that may be accessed from the file system over a period of time, a rule that defines the number of files or amount of data volume a group of users may access from the file system over a period of time, a rule that defines the number of files that may be accessed from a directory over a period of time, a rule that defines the number of files a group of users may access from a directory over a period of time, a rule that defines the number of files that may be accessed from a server over a period of time, and a rule that defines the number of files a group of users may access from a server over a period of time.

In another embodiment, the file system is one selected from the group consisting of: ext2, ext3, ReiserFS, Reiser4, Google File System, XFS, FAT, FAT12, FAT16, FAT32, NTFS, HFS and HFS+.

In another embodiment, the request is a read/write request.

In another embodiment, the method further comprises the step of commencing analysis of historical data access records.

In another embodiment, the method further comprises the step of commencing data inference analysis.

In a another embodiment, the intrusion detection profile further includes at least one inference pattern, the method further comprising: accumulating results from performed previous requests to an item; comparing the received request with at least one inference pattern, in order to determine whether a combination of accesses to the item match said inference pattern; and notifying the access control system, upon determining that a combination of accesses in the record match said inference pattern, to alter an item access rule, thereby making the received request an unauthorized request, before a result is transmitted to the user.

In a further embodiment, at least one of said at least one inference pattern is a Bayesian inference pattern.

In another embodiment, notifying the access control system further includes notifying the access control system to alter user authorization for additional system, including notifying systems across different system layers.

In a further embodiment, accumulating results from performed requests comprises accumulating results from at least one additional system.

In further embodiment, the additional system includes one selected from the group consisting of a file system, a database, an application, and a network.

In another embodiment, the method further comprises producing a scorecard that contains information selected from the group consisting of: violation attempts, session statistics, and data access statistics.

In a further embodiment, the data access statistics are with respect to a system layer selected from the group consisting of: a user, an application, a database, a query and a column.

Still another embodiment of the subject invention is directed to a system for detecting and preventing intrusion in a data at rest system comprising: a data at rest system; an access control manager in communication with the data at rest system; and one or more sensors, wherein the access control manager promulgates item access rules and distributes the item access rules to at least one of the one or more sensors which detect violations of the item access rules and report the violations to the access control manager.

In a further embodiment, the system of claim 19, wherein the access control manager analyzes at least one of the violations and adjusts at least one item access rule for a user or a group.

In another embodiment, the access control manager analyzes at least one of the violations and adjusts one or more of the following: at least one item access rule for an application or a data item, or other change of the security policy, including activating logging; at least one item access rule for a type of network traffic; and at least one item access rule for a type of data.

In another embodiment, the access control manager adjusts at least one item access rule due to one or more of the following: a change in a threat level, an increase or decrease in security violations, and the time and date.

In a further embodiment, the one or more sensors analyze network traffic at a level selected from the group consisting of the ISO/OSI Layer 2 level, the ISO/OSI Layer 3 level and the ISO/OSI Layer 7 level.

In a further embodiment, the access control manager produces a scorecard that contains information selected from the group consisting of: violation attempts; session statistics; and data access statistics.

In another embodiment, the data access statistics are with respect to a system layer selected from the group consisting of: a user; an application; a database; a query; and a column.

In a further embodiment, the one or more of the data access statistics are weighted to reflect the sensitivity of the item requested by the user.

Still another embodiment of the subject invention is directed to a method of detecting and preventing intrusion in a data at rest system comprising: accumulating results from performed previous requests to an item; receiving a request for data in the data at rest system from a user; comparing the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before a result is transmitted to the user.

Still another embodiment of the subject invention is directed to a method of detecting and preventing intrusion in a database comprising: accumulating results from performed previous requests to an item; receiving a request for data in the database from a user; comparing the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before a result is transmitted to the user.

Still another embodiment of the subject invention is directed to a computer-readable medium whose contents cause a computer to perform a method of detecting and preventing intrusion in a data at rest system comprising: receiving a plurality of intrusion detection profiles from an access control system, each profile including at least one item access rule, wherein a plurality of users are associated with at least one of the intrusion detection profiles; receiving a request for data in a data at rest system from a user; determining whether a result of said request causes the user to violate the at least one item access rule defined in the intrusion detection profile associated with the user; and if the at least one item access rule is violated, notifying the access control system to alter user authorization, thereby preventing the result of the request from being transmitted to the user.

Still another embodiment of the subject invention is directed to a computer-readable medium whose contents cause a computer to perform a method of detecting and preventing intrusion in a data at rest system comprising: accumulating results from performed previous requests to an item; receiving a request for data in the data at rest system from a user; comparing the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before a result is transmitted to the user.

Still another embodiment of the subject invention is directed to a computer-readable medium whose contents cause a computer to perform a method of detecting and preventing intrusion in a database comprising: accumulating results from performed previous requests to an item; receiving a request for data in the database from a user; comparing the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before a result is transmitted to the user.

It should be appreciated that the present invention can be implemented and utilized in numerous ways including, without limitation, as a process, an apparatus, a system, and a device. The invention can be implemented entirely or partially in software and/or hardware. The software can be contained on or in any computer readable medium. Certain embodiments of the invention and related aspects, features, and benefits will become more readily apparent from the following description and the accompanying drawings.

BRIEF DESCRIPTION OF THE DRAWINGS

The drawings generally are to illustrate principles of the invention and/or to show certain embodiments according to the invention. The drawings are not necessarily to scale. Each drawing is briefly described below.

DESCRIPTION

The present invention overcomes many of the prior art problems associated with detecting and preventing intrusions in data at rest systems. The advantages, and other features of the methods and systems disclosed herein, will become more readily apparent to those having ordinary skill in the art from the following detailed description of certain preferred embodiments taken in conjunction with the drawings which set forth representative embodiments of the present invention.

Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Figure 1:
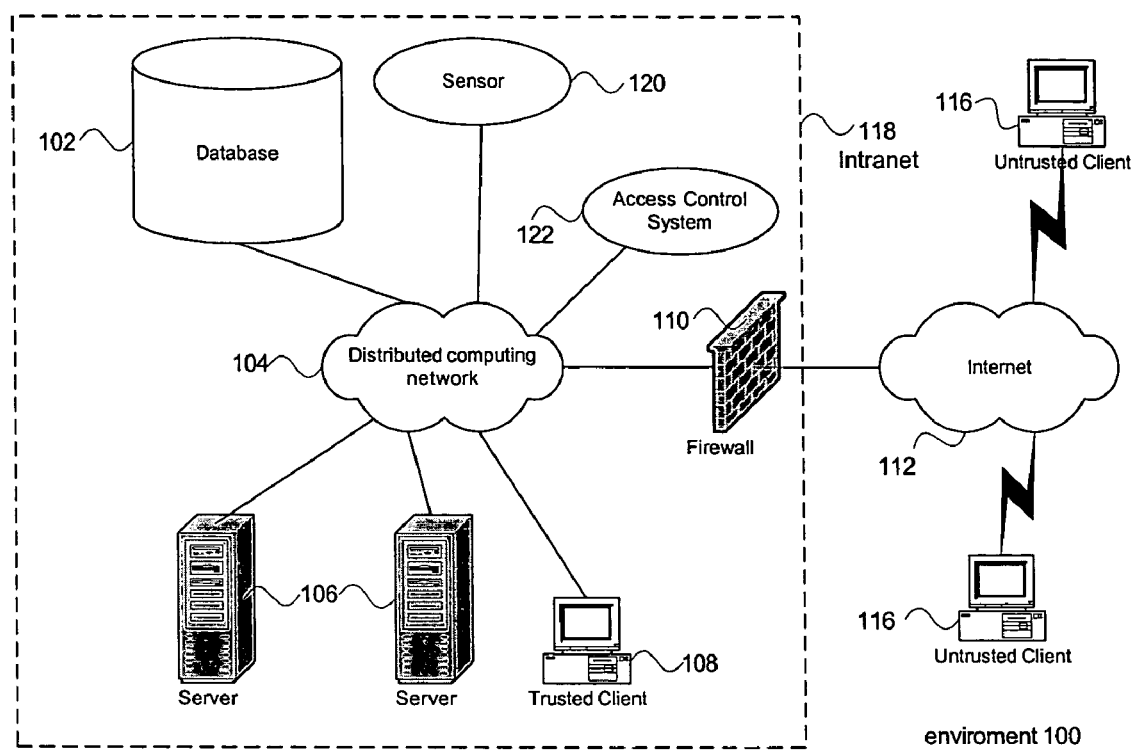
FIG. 1 is a diagram showing a network environment for data at rest systems such as databases and file servers in accordance with an embodiment of the subject technology.

Referring now to FIG. 1, an environment 100 contains a database 102, servers 106, and clients, trusted 108 and untrusted 116. For simplicity, only one database 102, two servers 106, one trusted client 108 and two untrusted clients 116 are shown. The database 102, servers 106, and trusted client 108 are connected via a distributed computing network 104 via communication channels, whether wired or wireless, as is known to those of ordinary skill in the pertinent art. The distributed computing network 104 may be one or more selected from the group: LAN, WAN, Internet, Intranet, Virtual Private Network, Ethernet and the like now known and later developed. While represented schematically as part of a separate entity or enterprise 118 in FIG. 1, a database 102 may be software or hardware integrated with a computer such as a server 106 or clients 108, 116.

The enterprise 118 is connected to the untrusted clients 116 via a network 112 such as the Internet. To control access to the network 104, a firewall 110 governs communication between the networks 104, 112. Firewalls 110 are well-known to those of ordinary skill in the art and, thus, not further described herein.

The servers 106 can be one or more servers known to those skilled in the art that are intended to be operably connected to a network so as to operably link to a plurality of clients 106, 108, and 116 via the distributed computer network 104. As illustration, the server 106 typically includes a central processing unit including one or more microprocessors such as those manufactured by Intel or AMD, random access memory (RAM), mechanisms and structures for performing I/O operations, a storage medium such as a magnetic hard disk drive(s), and an operating system for execution on the central processing unit. The hard disk drive of the servers 106 may be used for storing data, client applications and the like utilized by client applications. The hard disk drives of the server 106 also are typically provided for purposes of booting and storing the operating system, other applications or systems that are to be executed on the servers 106, paging and swapping between the hard disk and the RAM.

It is envisioned that the server 106 can utilize multiple servers in cooperation to facilitate greater performance and stability of the subject invention by distributing memory and processing as is well known. For reference, see, for example, U.S. Pat. No. 5,953,012 to Venghte et al. and U.S. Pat. No. 5,708,780 to Levergood et al.

The plurality of clients 108, 116 can be desktop computers, laptop computers, personal digital assistants, cellular telephones and the like now known and later developed. The clients 108, 116 can have displays as will be appreciated by those of ordinary skill in the pertinent art. The display may be any of a number of devices known to those skilled in the art for displaying images responsive to outputs signals from the computers 108, 116. Such devices include, but are not limited to, cathode ray tubes (CRT), liquid crystal displays (LCDs), plasma screens and the like. Although a simplified diagram is illustrated in FIG. 1 such illustration shall not be construed as limiting the present invention to the illustrated embodiment. It should be recognized that the signals being output from the computer can originate from any of a number of devices including PCI or AGP video boards or cards mounted within the housing of the clients 108, 116 that are operably coupled to the microprocessors and the displays thereof.

The clients 108, 116 typically include a central processing unit including one or more micro-processors such as those manufactured by Intel or AMD, random access memory (RAM), mechanisms and structures for performing I/O operations (not shown), a storage medium such as a magnetic hard disk drive(s), a device for reading from and/or writing to removable computer readable media and an operating system for execution on the central processing unit. According to one embodiment, the hard disk drive of the clients 108, 116 is for purposes of booting and storing the operating system, other applications or systems that are to be executed on the computer, paging and swapping between the hard disk and the RAM and the like. In one embodiment, the application programs reside on the hard disk drive for performing the functions in accordance with the transcription system. In another embodiment, the hard disk drive simply has a browser for accessing an application hosted within the distributed computing network 104. The clients 108, 116 can also utilize a removable computer readable medium such as a CD or DVD type of media that is inserted therein for reading and/or writing to the removable computer readable media.

The servers and clients typically include an operating system to manage devices such as disks, memory and I/O operations and to provide programs with a simpler interface to the hardware. Operating systems include: Unix®, available from the X/Open Company of Berkshire, United Kingdom; FreeBSD, available from the FreeBSD Foundation of Boulder, Colo.; Linux®, available from a variety of sources; GNU/Linux, available from a variety of sources; POSIX®, available from IEEE of Piscataway, N.J.; OS/2®, available from IBM Corporation of Armonk, N.Y.; Mac OS®, Mac OS X®, Mac OS X Server®, all available from Apple Computer, Inc. of Cupertino, Calif.; MS-DOS®, Windows®, Windows 3.1®, Windows 95®, Windows 2000®, Windows NT®, Windows XP®, Windows Server 2003®, Windows Vista®, all available from the Microsoft Corp. of Redmond, Wash.; and Solaris®, available from Sun Microsystems, Inc. of Santa Clara, Calif. See generally Andrew S. Tanenbaum, *Modern Operating Systems* (2d ed. 2001). Operating systems are well-known to those of ordinary skill in the pertinent art and, thus, not further described herein.

The file system may implement one or more file systems to handle how disks and other storage means are "structured, named, accessed, used, protected and implemented." Ibid. Examples of file systems include: ext2, ext3 and XFS, implemented as part of various Linux flavors; ReiserFS and Reiser4, both supported for GNU/Linux; Google File System, produced by Google Inc. of Menlo Park, Calif.; and FAT, FAT12, FAT16, FAT32, NTFS, implemented as part of the Windows® operating systems by Microsoft Corp. of Redmond, Wash.; BFS, HFS+, both implemented as part of Mac OS® by Apple Computer, Inc. of Cupertino, Calif. File systems are well-known to those of ordinary skill in the pertinent art and, thus, not further described herein.

The environment also includes one or more sensors 120 and one or more access control systems 122. The one or more sensors 120 may be implemented as part of a server 106, a client 108, 116, a database 102 or as a freestanding network component (e.g., as a hardware device). The sensor 120 may be implemented with technology similar to the Defiance™ TMS Monitor, available from Protegrity Corp. of Stamford, Conn. Preferably, the one or more sensors 120 implemented separately from any data at rest systems, such as databases or file systems, in order to monitor bidirectional data flows in the network.

The access control system 122 may be any system or apparatus capable of producing an intrusion detection profile. The access control system 122 may be implemented in many ways including, but not limited to, embodiment in a server 106, a client 108, 116, a database 102 or as a freestanding network component (e.g., as a hardware device). In a preferred embodiment, the access control system 122 is part of the Secure.Data™ server, available from Protegrity Corp. of Stamford, Conn. The access control system 122 continually monitors user activity, and prevents a user from accessing data that the user is not cleared for. This process is described in detail in WO 97/49211, hereby incorporated by reference.

The flow charts illustrated herein represent the structure or the logic of methods for an embodiment of a computer program according to the invention. The program is preferably executed in the environment 100. The flow charts illustrate the structures and functions of the computer program code elements (which could instead be implemented entirely or partially as one or more electronic circuits). As such, the present disclosure may be practiced in its essential embodiments by a machine component that renders the program code elements in a form that instructs a digital processing apparatus (e.g., computer) to perform a sequence of function steps corresponding to those shown in the flow charts. The software and various processes discussed herein are merely exemplary of the functionality performed by the disclosed technology and thus such processes and/or their equivalents may be implemented in commercial embodiments in various combinations and quantities without materially affecting the operation of the disclosed technology.

Figure 2:
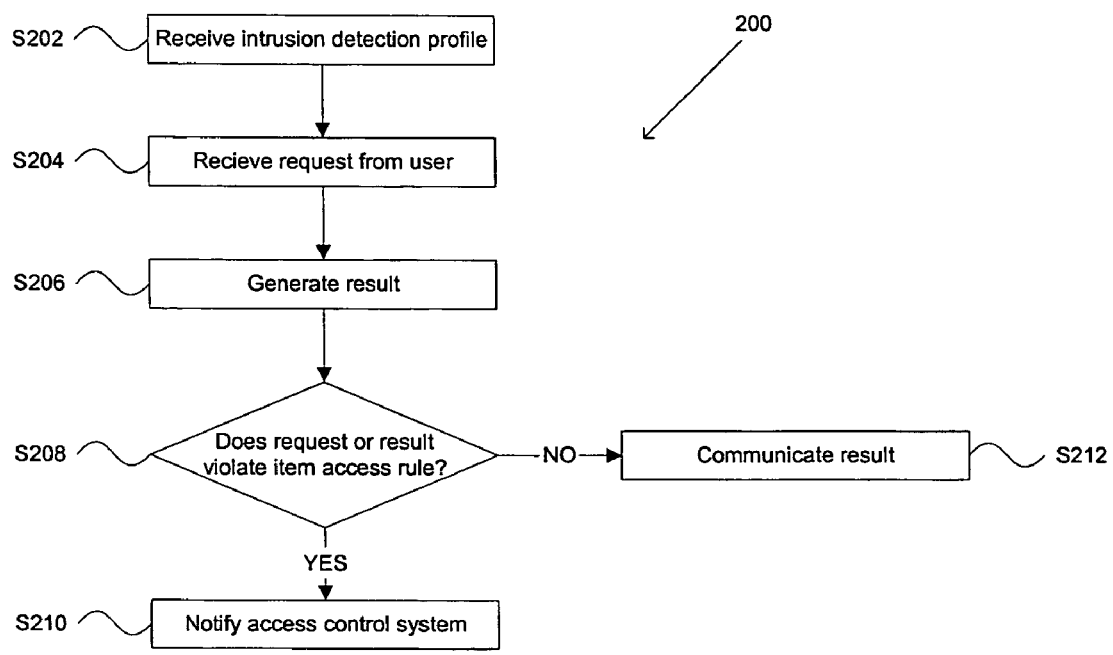
FIG. 2 is a flow diagram illustrating a method in accordance with an embodiment of the subject technology.

Referring now to FIG. 2, there is illustrated a flowchart 200 depicting a process for detecting and preventing intrusion in a data at rest system. A data at rest system, such as a file system or web server, stores information in a durable manner and is to be distinguished from a database.

At step S202, the access control system 122 distributes intrusion detection profiles to the one or more sensors 120. As will be discussed below, the profiles are created protect data stored within an intranet 118.

An intrusion detection profile may exist in many forms including, but not limited to, plain text, mathematical equations and algorithms. The profile may contain one or more item access rules. Each item access rule may permit and/or restrict access to one or more resources. A rule may apply generally to all users, or the rule may apply to specific users, groups, roles, locations, machines, processes, threads and/or applications. For example, system administrators may be able to access particular directories and run certain applications that general users cannot. Similarly, some employees may be completely prohibited from accessing one or more servers or may have access to certain servers, but not certain directories or files.

Furthermore, rules may vary depending on the date and time of a request. For example, a backup utility application may be granted access to a server from 1:00 AM until 2:00 AM on Sundays to perform a backup, but may be restricted from accessing the server otherwise. Similarly, an employee may have data access privileges only during normal business hours.

Additionally, the rules need not simply grant or deny access, the rules may also limit access rates. For example, an employee may be granted access to no more than 60 files per hour without manager authorization. Such limitations may also be applied at more granular levels. For example, an employee may have unlimited access to a server, but be limited to accessing 10 confidential files per hour.

Rules may also grant, prohibit and/or limit item access for a particular type of network traffic. Item access rules may discriminate between various types of network traffic using a variety of parameters as is known to one of ordinary skill in the art including, but not limited to, whether the traffic is TCP or UDP, the ISO/OSI layer, the contents of the message and the source of the message.

These types of item access rules, as well as other rules known to those skilled in the art now or in the future, may be implemented in isolation or in combination. For example, an employee in a payroll department might be granted increased access to timesheet files on Mondays in order to review paychecks before releasing information to the company's bank. This same employee might have less access from Tuesday through Sunday.

In some embodiments, data intrusion profiles may be fashioned by an entity such as the access control system 122 or an administrator to reflect usage patterns. For example, an employee, who during the course of a previous year never accesses a server after 7:00 PM, may be prohibited from accessing the database at 8:15 PM as this may be indicative of an intrusion either by the employee or another person who has gained access to the employee's login information.

Still referring to FIG. 2, at step S204, a request for access to the data at rest system 102 is received. This request may come from a variety of sources (referred herein to as a "requestor") including, but not limited to, servers 106 and clients 108, 116. The request may be for data including, but not limited to, file(s), record(s), image(s), audio file(s), video file(s), object(s), software component(s), web page(s) and application(s). The request also may be for a system resource including, but not limited to, process(es), thread(s), clock cycles, network connection(s), network service(s), disk space, memory and band width. The request may occur in a variety of ways including, but not limited to, a database query, a system call, an interrupt, an exception and a CORBA request.

At step S206, a result is generated for the request by executing the request, as is known to those of skill in the art. For example, if the request is wild card search, the request is executed against the appropriate server. It is noted that executing the request may be omitted in some circumstances, particularly where the request constitutes a per se violation of an item access rule. An example of such a violation might be requesting all mechanical drawings for a project that an engineer is not working on. Omitting step S206 in these cases avoids a waste of system resources in responding to inappropriate requests.

At step S208, the request and/or the result are analyzed against the one or more item access rules. If the request and/or result does not violate an item access rule, control passes to step S212 in which the result is communicated to the requestor via the appropriate technology for the request as known by persons of ordinary skill in the art. If the request does violate an item access rule, control passes to step S210 in which the access control system 122 is notified of the violation.

Item access rules may be further refined to limit or prohibit access to marked items in a data at rest system. The rules limiting access could be similar to the item access rules described herein, but would apply in whole or in part to marked items, as opposed to all items in the data at rest system. Marked items could include any item capable of storage in data at rest systems including, but not limited to, files, images, sound recording and videos. Marked items could be identified in many ways as is known to one of ordinary skill in the art. Examples of such means of identification include, but are not limited to: inclusion of a flag in file attributes; naming conventions; and the creation of a list or database listing marked items. Certain marked items (e.g., security log files) may be so sensitive that any attempts to access the file should automatically trigger intrusion detection. Such intrusion detection may include a variety of components that will vary based on a particular implementation of the invention and procedures of the organization using an embodiment of the invention.

Examples of intrusion detection procedures may include, but are not limited to writing a log, modifying one or more item access rules to place restrictions or prohibition on access to one or more resources for defined period of time or until an administrator restores access, alerting one or more administrators of a potential intrusion, altering one or more intrusion detection profiles and/or item access rules, altering a security level, shutting down one or more data at rest systems, commencing analysis of historical data access records and commencing inference analysis. Analysis of historical data access records may employ methods and/or systems for the compilation of access records, computations of statistics based on the records, and/or presentation of the records and statistics. The presentation of the records and statistics may include textual, pictorial and/or graphical elements.

Inference analysis may include the use of data mining and machine learning technologies and techniques such as Bayes' theorem. For example, anti-spam filters are becoming increasingly sophisticated, with accuracy rates in the high 90 percent being the norm. The best solutions combine Bayesian filtering and content inspection. Most use some combination of Bayesian filtering and content analysis along with whitelists and blacklists. The content filtering will inspect the accessed data element over time and the relation to sensitive data element. As a general rule, accuracy improves when inspection is moved farther away from the desktop and closer to the server.

Bayes' theorem is a facet of probability theory that relates the conditional and marginal probability distributions of random variables. The goal of the inference analysis is to detect patterns and develop heuristics or algorithms that predict intrusions. In machine learning implementations, such as spam filtering or detecting intrusions, Bayes' theorem is instructive on how to update or revise beliefs a posteriori in light of new evidence.

The goal of inference is typically to find the distribution of a subset of the variables, conditional upon some other subset of variables with known values (the evidence), with any remaining variables integrated out. This is known as the posterior distribution of the subset of the variables given the evidence. The posterior gives a universal sufficient statistic for detection applications, when one wants to choose values for the variable subset which minimize some expected loss function, for instance the probability of decision error. A Bayesian network can thus be considered a mechanism for automatically constructing extensions of Bayes' theorem to more complex problems. The most common exact inference methods are variable elimination which eliminates (by integration or summation) the non-observed non-query variables one by one by distributing the sum over the product, clique tree propagation which caches the computation so that the many variables can be queried at one time and new evidence can be propagated quickly, and recursive conditioning which allows for a space-time tradeoff but still allowing for the efficiency of variable elimination when enough space is used. All of these methods have complexity that is exponential in tree width. The most common approximate inference algorithms are stochastic MCMC simulation, mini-bucket elimination which generalizes loopy belief propagation, and variational methods.

In order to fully specify the Bayesian network and thus fully represent the joint probability distribution, it is necessary to further specify for each node X the probability distribution for X conditional upon X's parents. The distribution of X conditional upon its parents may have any form. It is common to work with discrete or Gaussian distributions since that simplifies calculations. Sometimes only constraints on a distribution are known; one can then use the principle of maximum entropy to determine a single distribution, the one with the greatest entropy given the constraints. (Analogously, in the specific context of a dynamic Bayesian network, one commonly specifies the conditional distribution for the hidden state's temporal evolution to maximize the entropy rate of the implied stochastic process.)

Often these conditional distributions include parameters which are unknown and must be estimated from data, sometimes using the maximum likelihood approach. Direct maximization of the likelihood (or of the posterior probability) is often complex when there are unobserved variables. A classical approach to this problem is the expectation-maximization algorithm which alternates computing expected values of the unobserved variables conditional on observed data, with maximizing the complete likelihood (or posterior) assuming that previously computed expected values are correct. Under mild regularity conditions this process converges on maximum likelihood (or maximum posterior) values for parameters. A more fully Bayesian approach to parameters is to treat parameters as additional unobserved variables and to compute a full posterior distribution over all nodes conditional upon observed data, then to integrate out the parameters. This approach can be expensive and lead to large dimension models, so in practice classical parameter-setting approaches are more common.

Embodiments of the invention implementing Bayesian inferences may begin with predefined rules and/or beliefs regarding user behaviors. Information is gathered from users' requests. As discussed herein, these requests are evaluated against said rules and beliefs. If a request violates a rule or conforms to a belief that the request constitutes an intrusion, the request is denied. Beliefs may be expressed probabilistically, i.e. instead of predicting whether a request constitutes an intrusion or not, embodiments of the invention herein may produce probabilities that a request constitutes an intrusion. These probabilities may be blended with other probabilities produced through other statistical methods as is well known to those of ordinary skill in the art. See, e.g., Lin, U.S. patent application publication number 20040267893, which is incorporated herein by reference.

Embodiments of the invention utilize outside knowledge to revise beliefs and rules. For example, if a manager requests several documents for a project that she is not affiliated with, embodiments of the invention herein may deny access to the files. The manager may, in turn, contact a helpdesk or other system administrator to justify her need for the files. Assuming that the need is legitimate, the helpdesk or administrator may modify classification of the request as not an intrusion. The invention, in turn, will be less likely to classify similar requests by similar users as an intrusion in the future.

In embodiments of the invention configured to prevent intrusion in a file system, the item access rule may limit the number or read and/or write requests that may be processed by a user and/or a group of users in one or more files, one or more directories, one or more servers and/or the entire file system. Additionally, item access rules may limit the number of files and/or volume of data that may be accessed by a user or group of users in one or more files, one or more directories, one or more servers and/or the entire file system. Embodiments of the invention described herein may be implemented for a variety of file systems including but not limited to those described herein.

In some embodiments of the invention, inference patterns and analysis as described herein are included in intrusion detection policies. A violation of a inference pattern may result in the access control system 122 restricting access to the data at rest system that the requestor is attempting to access and may also restrict access to additional systems including, but not limited to, file system(s), database(s), application(s) and network(s). As described herein, the inference patterns and analysis may include Bayesian inference.

Various embodiments of the invention may produce a scorecard. The scorecard may contain information gathered by sensors 120 and the access control system 122 as well as information from log files including, but not limited to, violation attempts, session statistics and data access statistics. The scorecard may be presented in many formats including, but not limited to, textual, pictorial, graphical and in electronic format, such as a webpage. The scorecard may show data access statistics with respect to an entity including, but not limited to, user, application, database, query and column. The scorecard may also include a metric to represent the severity of a threat. In computing the metric, item requests may be given varying weights depending on the sensitivity of the data.

Embodiments of the invention include a system including an access control manager 122 and one or more sensors 120 as depicted in FIG. 1. The access control manager 122 promulgates item access rules and distributes the item access rules to the one or more sensors 120. The one or more sensors 120 detect violations of item access rules and report the violations to the access control manager 122. In response to a violation, the access control manager 122 may adjust one or more item access rules for user(s), groups(s) and/or all users. The access control system 122 also may adjust one or more item access rules for an item or change the security policy, for example, by activating logging. The access control system 122 may also adjust one or more item access rule with regard to one or more types of network traffic. The sensors 120 may be programmed to monitor traffic at a particular network layer. For example, one or more sensors may monitor traffic at ISO/OSI Layer 2, Layer 3 and/or Layer 7.

Embodiments of the invention also include methods of detecting intrusion in a data at rest system or a database. One or more sensors 120 accumulate results from performed previous requests to an item. One or more sensors 120 receive a request for data in a data at rest system or database from a user. The sensor 120 compares the received request with at least one Bayesian inference pattern in order to determine whether a combination of accesses to the item match said inference pattern. If a combination of accesses to the item match said inference pattern, the sensor 120 notifies the access control system 122. This notification causes the access control system 122 to make the received request an unauthorized request before the result it transmitted to the user.

What is claimed is:

1. A method of detecting and preventing intrusion in a data at rest system comprising:

receiving a plurality of intrusion detection profiles from an access control system, each profile including at least one item access rule, wherein a plurality of users are associated with at least one of the intrusion detection profiles;

receiving a request for data in a data at rest system from a user;

receiving a result for the request from the data at rest system if the request is not a per se violation of one of the at least one item access rules, wherein the result is a subset of data in the data at rest system;

determining whether the result of said request causes the user to violate the at least one item access rule defined in the intrusion detection profile associated with the user; and if the at least one item access rule is violated, notifying the access control system to alter user authorization, thereby preventing the result of the request from being transmitted to the user.

2. The method of claim 1, further comprising: accumulating results from performed requests and determining whether the accumulated results violate any one of said at least one item access rule.

3. The method of claim 1, wherein the at least one item access rules are selected from the group of a rule that limits access to the data at rest system at certain defined dates and times, a rule that prohibits access to the data at rest system, a rule that limits the user's ability to run a query at certain defined dates and times and a rule that prohibits the user from running a query.

4. The method of claim 1, wherein items subject to item access rules are marked in the data at rest system, and wherein any request concerning said items automatically triggers intrusion detection.

5. The method of claim 1, wherein the step of determining whether the result violates the item access rule is determining if an item access rate is exceeded, and proceeding with the intrusion detection process only upon determining that the item access rate is exceeded.

6. The method of claim 1, wherein the data at rest system is a file system.

7. The method of claim 6, wherein one of said at least one item access rules is selected from the group of rules consisting of a rule that defines the number of files a user may access from the file system at one time, a rule that defines the number of files a group of users may access from the file system at one time, a rule that defines the number of files that may be accessed from the file system over a period of time, a rule that defines the number of files or amount of data volume a group of users may access from the file system over a period of time, a rule that defines the number of files that may be accessed from a directory over a period of time, a rule that defines the number of files a group of users may access from a directory over a period of time, a rule that defines the number of files that may be accessed from a server over a period of time, and a rule that defines the number of files a group of users may access from a server over a period of time.

8. The method of claim 6, wherein the file system is one selected from the group consisting of: ext2, ext3, ReiserFS, Reiser4, Google File System, XFS, FAT, FAT12, FAT16, FAT32, NTFS, HFS and HFS+.

9. The method of claim 1, wherein the request is a read/write request.

10. The method of claim 1, further comprising the step of commencing analysis of historical data access records.

11. The method of claim 1, further comprising the step of commencing data inference analysis.

12. The method of claim 1, wherein the intrusion detection profile further includes at least one inference pattern, the method further comprising:
    accumulating results from performed previous requests to an item;
    comparing the received request with at least one inference pattern, in order to determine whether a combination of accesses to the item match said inference pattern; and
    notifying the access control system, upon determining that a combination of accesses in the record match said inference pattern, to alter an item access rule, thereby making the received request an unauthorized request, before a result is transmitted to the user.

13. The method of claim 12, wherein at least one of said at least one inference pattern is a Bayesian inference pattern.

14. The method of claim 1, wherein notifying the access control system further includes notifying the access control system to alter user authorization for additional system, including notifying systems across different system layers.

15. The method of claim 2, wherein accumulating results from performed requests comprises accumulating results from at least one additional system.

16. The method of claims 15, wherein the additional system includes one selected from the group consisting of a file system, a database, an application, and a network.

17. The method of claim 1, wherein the method further comprises producing a scorecard that contains information selected from the group consisting of: violation attempts, session statistics, and data access statistics.

18. The system of claim 17, wherein the data access statistics are with respect to a system layer selected from the group consisting of: a user, an application, a database, a query and a column.

19. A system for detecting and preventing intrusion in a data at rest system comprising:
    a data at rest system;
    an access control manager in communication with the data at rest system; and
    one or more sensors, wherein the access control manager promulgates item access rules and distributes the item access rules to at least one of the one or more sensors which determine if a result of a user request causes the user to violate at least one of the item access rules and report violations to the access control manager, wherein the result is a subset of data in the data at rest system.

20. The system of claim 19, wherein the access control manager analyzes at least one of the violations and adjusts at least one item access rule for a user or a group.

21. The system of claim 19, wherein the access control manager analyzes at least one of the violations and adjusts one or more of the following: at least one item access rule for an application or a data item, or other change of the security policy, including activating logging; at least one item access rule for a type of network traffic; and at least one item access rule for a type of data.

22. The system of claim 19, wherein the access control manager adjusts at least one item access rule due to one or more of the following: a change in a threat level, an increase or decrease in security violations, and the time and date.

23. The system of claim 19, wherein the one or more sensors analyze network traffic at a level selected from the group consisting of the ISO/OSI Layer 2level, the ISO/OSI Layer 3 level and the ISO/OSI Layer 7 level.

24. The system of claim 19, wherein the access control manager produces a scorecard that contains information selected from the group consisting of: violation attempts; session statistics; and data access statistics.

25. The system of claim 19, wherein the data access statistics are with respect to a system layer selected from the group consisting of: a user; an application; a database; a query; and a column.

26. The system of claim 25, wherein the one or more of the data access statistics are weighted to reflect the sensitivity of the item requested by the user.

27. A method of detecting and preventing intrusion in a data at rest system comprising:
    accumulating results from performed previous requests to an item;
    receiving a request for data in the data at rest system from a user;
    receiving a result for the request from the data at rest system if the request is not a per se violation of one of the at least one item access rules, wherein the result is a subset of data in the data at rest system;

comparing the result of the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before the result is transmitted to the user.

28. A method of detecting and preventing intrusion in a database comprising:

accumulating results from performed previous requests to an item;

receiving a request for data in the database from a user;

receiving a result for the request from the database if the request is not a per se violation of one of the at least one item access rules, wherein the result is a subset of data in the database;

comparing the result of the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before the result is transmitted to the user.

29. A computer-readable medium whose contents cause a computer to perform a method of detecting and preventing intrusion in a data at rest system comprising:

receiving a plurality of intrusion detection profiles from an access control system, each profile including at least one item access rule, wherein a plurality of users are associated with at least one of the intrusion detection profiles;

receiving a request for data in a data at rest system from a user;

receiving a result for the request from the data at rest system if the request is not a per se violation of one of the at least one item access rules, wherein the result is a subset of data in the data at rest system;

determining whether the result of said request causes the user to violate the at least one item access rule defined in the intrusion detection profile associated with the user; and if the at least one item access rule is violated, notifying the access control system to alter user authorization, thereby preventing the result of the request from being transmitted to the user.

30. A computer-readable medium whose contents cause a computer to perform a method of detecting and preventing intrusion in a data at rest system comprising:

accumulating results from performed previous requests to an item;

receiving a request for data in the data at rest system from a user;

receiving a result for the request from the data at rest system if the request is not a per se violation of one of the at least one item access rules, wherein the result is a subset of data in the data at rest system;

comparing the result of the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before the result is transmitted to the user.

31. A computer-readable medium whose contents cause a computer to perform a method of detecting and preventing intrusion in a database comprising:

accumulating results from performed previous requests to an item;

receiving a request for data in the database from a user;

receiving a result for the request from the database if the request is not a per se violation of one of the at least one item access rules, wherein the result is a subset of data in the database;

comparing the result of the received request with at least one Bayesian inference pattern, in order to determine whether a combination of accesses to the item match said inference pattern; and notifying the access control system, upon determining that a combination of accesses to the item match said inference pattern, to alter an item access rule, thereby making the received request an unauthorized request, before the result is transmitted to the user.

32. A method of detecting and preventing intrusion in a data at rest system comprising:

receiving a plurality of intrusion detection profiles, each profile including at least one item access rule, wherein a plurality of users are associated with at least one of the intrusion detection profiles;

receiving a request for data in a data at rest system from a user;

receiving a result for the request from the data at rest system if the request is not a per se violation of one of the at least one item access rules, wherein the result is a subset of data in the data at rest system;

determining whether the result of said request causes the user to violate the at least one item access rule defined in the intrusion detection profile associated with the user; and if the at least one item access rule is violated, preventing the result of the request from being transmitted to the user.

33. A method of detecting and preventing intrusion in a data at rest system comprising:

accumulating results from performed previous requests to an item;

receiving a request for data in the data at rest system from a user;

receiving a result for the request from the data at rest system if the request is not a per se violation of one of the at least one item access rules, wherein the result is a subset of data in the data at rest system;

comparing the result of the received request with at least one Bayesian inference pattern, in order to determine whether a combination of accesses to the item match said inference pattern; and upon determining that a combination of accesses to the item match said inference pattern, altering an item access rule, thereby making the received request an unauthorized request, before the result is transmitted to the user.

34. A computer-readable medium whose contents cause a computer to perform a method of detecting and preventing intrusion in a data at rest system comprising:

receiving a plurality of intrusion detection profiles, each profile including at least one item access rule, wherein a plurality of users are associated with at least one of the intrusion detection profiles;

receiving a request for data in a data at rest system from a user;

receiving a result for the request from the data at rest system if the request is not a per se violation of one of the at least one item access rules, wherein the result is a subset of data in the data at rest system;

determining whether the result of said request causes the user to violate the at least one item access rule defined in the intrusion detection profile associated with the user; and if the at least one item access rule is violated, preventing the result of the request from being transmitted to the user.

35. A computer-readable medium whose contents cause a computer to perform a method of detecting and preventing intrusion in a data at rest system comprising:

accumulating results from performed previous requests to an item;

receiving a request for data in the data at rest system from a user;

receiving a result for the request from the data at rest system if the request is not a per se violation of one of the at least one item access rules, wherein the result is a subset of data in the data at rest system;

comparing the result of the received request with at least one Bayesian inference pattern, in order to determine whether a combination of accesses to the item match said inference pattern; and upon determining that a combination of accesses to the item match said inference pattern, altering an item access rule, thereby making the received request an unauthorized request, before the result is transmitted to the user.

* * * * *